Figure 1:
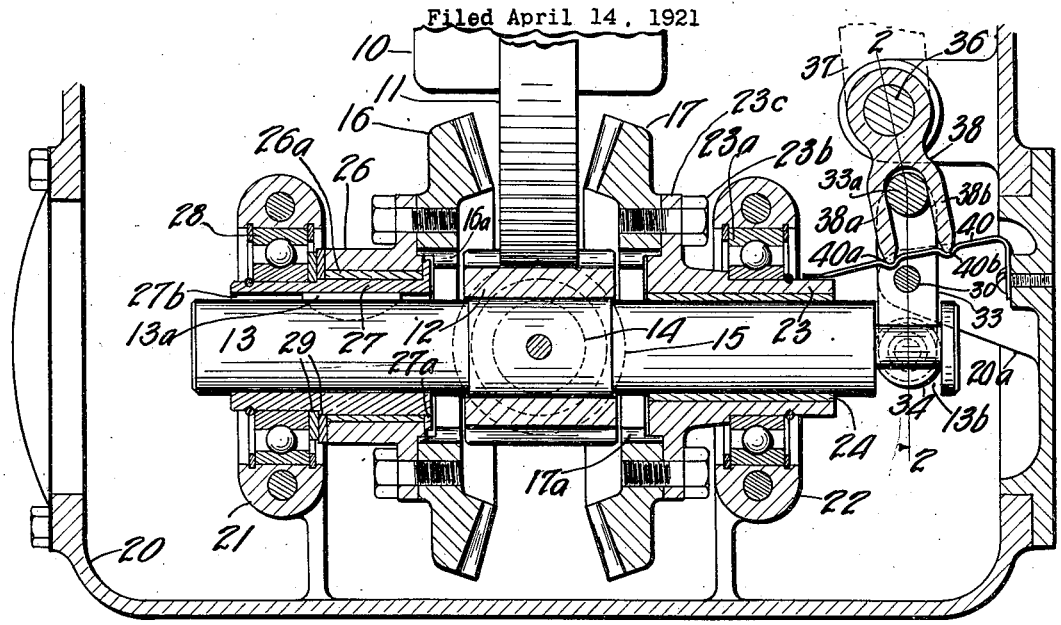

May 22, 1923.

R. H. WHITE

DIRECTION CHANGING TRANSMISSION MECHANISM

Filed April 14, 1921

1,456,349

Inventor
Rollin H. White
By Thurston Kwis & Hudson
Attorneys.

Patented May 22, 1923.

1,456,349

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

DIRECTION-CHANGING TRANSMISSION MECHANISM.

Application filed April 14, 1921. Serial No. 461,286.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Direction-Changing Transmission Mechanism, of which the following is a full, clear, and exact description.

The object of the present invention is to provide efficient and not expensive mechanism by which motion from a driving shaft which rotates in one direction only may be so transmitted to the differential gearing on a motor vehicle that it may be rotated at will in either direction.

The invention consists in the construction and combination of parts shown in the drawing and hereinafter described and pointed out definitely in the appended claims.

Figure 2:
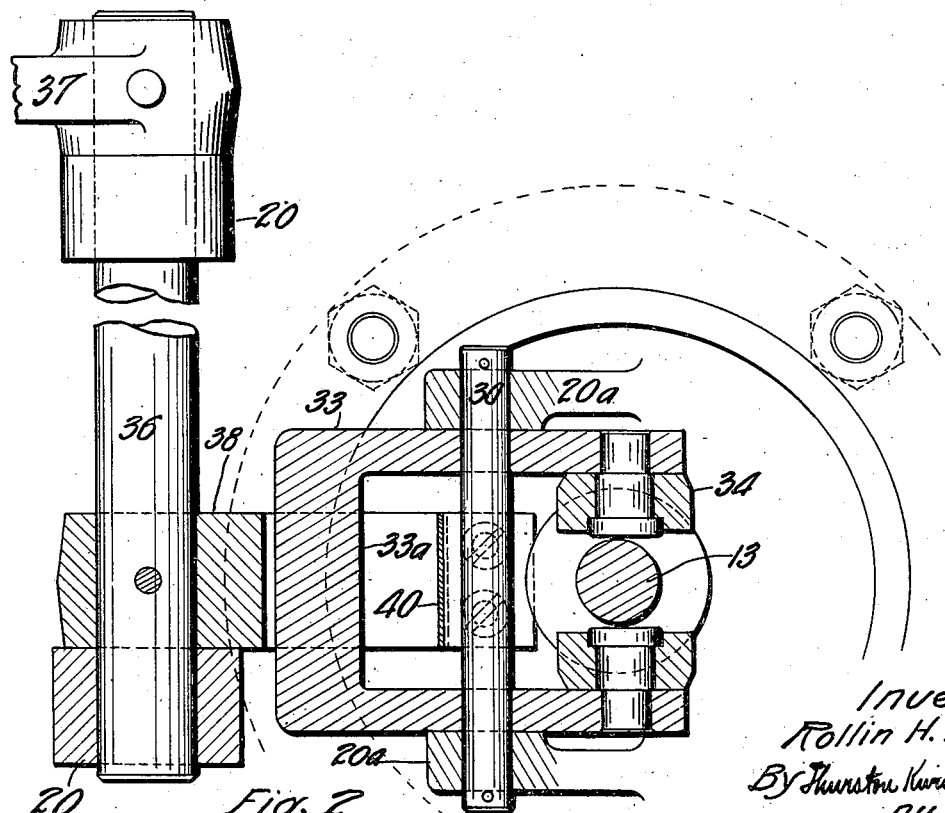

In the drawing, Fig. 1 is a sectional rear elevation of the invention, and Fig. 2 is a sectional view in the plane of line 2—2 on Fig. 1.

Referring to the parts by reference characters, 10 represents the rotating drum or housing of any conventional or suitable differential mechanism, such as is used on motor vehicles for transmitting differentiated motion to the two driving axles of the vehicle. Those familiar with this art will understand that as this differential housing or drum is rotated in one direction or the other, the two driving axles will be correspondingly rotated through the differential gearing housed within the drum, to the end that the vehicle shall be driven forward or backward, according to circumstances. A large spur ring gear 11 is secured coaxially to the differential drum, and this is always in mesh with a wide spur pinion 12 fixed to a rotatable shaft 13.

The present invention has to do with the means by which this shaft 13 is supported and may be moved endwise, and rotated in either direction by a longitudinally extended driving shaft 14, which is shown in dotted lines. Two bevel gears 16 and 17 are mounted coaxially with shaft 13 in the manner to be presently described. A bevel gear 15 is in mesh with both of the two bevel gears 16 and 17 whereby they will be rotating in opposite directions. The gear 15 and the longitudinally extended driving shaft 14 to which it is secured are shown by dotted lines in Fig. 1. The gears 16 and 17 may turn independently of shaft 13, or either gear may be clutched to the shaft. When the gear 17 is clutched to said shaft, it and the differential drum will be turned in that direction which will cause the vehicle to move forward. The gear 16 is the reverse gear, and when it is clutched to the shaft 13, said shaft and differential drum will be rotated in the reverse direction and cause the vehicle to move backward.

This mechanism is enclosed and mounted within a casing 20 within which are two aligned bearing brackets 21, 22. The hub 23 of the gear 17 is rotatably mounted within the bearing bracket 22 there being interposed between such hub and bearing bracket an ordinary annular ball bearing 23ª. This hub contains a bushing 24, and the shaft 13 is slidably fitted within the bushing and is capable of rotating therein. The hub 23 is formed independently of gear 17, is provided with an end flange 23ᶜ. The bevel gear 17 is an annulus and it is fixed to said flange by cap screws 23ᵇ. The inner periphery of the gear 17 is formed with gear teeth 17ª which are adapted to intermesh with the pinion 12 to thereby clutch together the shaft 13 and gear 17.

The reverse is also an annulus and its inner periphery is also provided with gear teeth adapted to intermesh with pinion 12, to clutch the gear to shaft 13, there being an ordinary annular ball bearing 28 interposed between this sleeve and the bearing 21.

The gear 16 is fixed to the flanged inner end of a sleeve hub 26, which has a bushing 26ª within which a sleeve 27 is rotatable, said sleeve being rotatably supported on annular ball bearings 28 carried by the bearing bracket 21. The ball bearing prevents endwise movement of sleeve 27; and endwise movement of the gear hub 26 on said sleeve is prevented by the fact that said hub is fitted between a flange 27ª on sleeve 27, and washers 29 which engage the inner ring of the adjacent annular ball bearing.

The shaft 13 is rotatable within the gear hub 23, and is movable endwise in said hub and in the sleeve 27, with which however the shaft 13 has a driving connection formed by a key 13ª and a groove 27ᵇ in the sleeve.

When the gear 17 is clutched to shaft 13, as will be the case during all of the time when the vehicle is traveling forward, the load on shaft 13 will be sustained by the two ball bearings; and in that event the gear 16 will not be transmitting any load but will rotate upon the sleeve 27. When, however, the vehicle is moving backward as the result of clutching gear 16 to shaft 13, the load on shaft 13 will be sustained by the ball bearing 28, and by the plain bearing between shaft 13 and the hub 23. But the vehicle is backed such a very small part of the time, that the loss of efficiency due to the plain bearing between the shaft and hub 23 is negligible, and is more than offset by the saving effected by the use of the ball bearings only.

The following mechanism is provided for moving the shaft 13 from the neutral position, as shown in Fig. 1, in either direction to selectively clutch it to the gears 16 and 17. An annular groove 13$^b$ is formed in the shaft 13 near one end thereof. A pivoted shifter yoke 33 straddles this shaft and its arms carry rollers 34 which engage in said groove. The yoke is pivoted about midway between its ends on a pin 30 supported by brackets 20$^a$ of the casing 20. The two arms of the yoke are connected at one end by a transverse bar 33$^a$, which is straddled and embraced by the forked end of the shifter lever 38, which lever is fixed to a rock shaft 36 having an operating handle 37. The rocking of this rock shaft will cause the endwise movement of the shaft to any desired position.

There are three positions in which it is desired to latch the shaft. To do this both arms of the shifter yoke are beveled to an edge; and a spring 40 is fixed to the casing in such position that two grooves 40$^a$, 40$^b$, may be engaged by the yoke arms. When the shaft is in the neutral position both yoke arms engage these grooves as shown. When the yoke is rocked to move the shaft to the right from the neutral position as shown in Fig. 1, the left arm of the yoke engages the groove 40$^b$. When the shaft is moved in the other direction the right arm of the yoke will engage in groove 40$^a$. In all cases the shaft will be latched, but may be easily unlatched by the same movement of the yoke which is required to move the shaft.

Having described my invention, I claim:—

1. In mechanism of the character specified, the combination of two bearing supports, a bevel gear having a tubular hub which is rotatably mounted in one of said supports, a tubular sleeve which is rotatably mounted in the other of said supports, a bevel gear rotatably mounted upon said sleeve, a driving bevel gear engaging both of the bevel gears specified, a shaft which is rotatably fitted in the tubular hub of the first mentioned bevel gear and is also fitted within and has a tongue and groove engagement with said sleeve, a spur pinion fixed to said shaft between the two bevel gears, and means to selectively clutch the two bevel gears to said shaft.

2. In mechanism of the character specified, the combination of two bearing supports, a bevel gear having a tubular hub which is rotatably mounted on annular ball bearings in one of said supports, a tubular sleeve which is rotatably mounted on annular ball bearings in the other of said supports, a bevel gear whose hub is rotatably mounted upon said sleeve, a driving bevel gear engaging both bevel gears specified whereby they may be driven in opposite directions, a shaft which is rotatably fitted in the tubular hub of the first mentioned bevel gear and is also fitted within and has a tongue and groove engagement with the said sleeve, a spur pinion fixed to said shaft between the two bevel gears, and means operable by the endwise movement of said shaft to selectively clutch the two bevel gears to it, and means to move said shaft endwise.

3. In mechanism of the character specified, the combination of two bearing supports, a bevel gear having a tubular hub which is rotatably mounted on annular ball bearings in one of said supports, a tubular sleeve which is rotatably mounted on annular ball bearings in the other of said supports, a bevel gear whose hub is rotatably mounted upon said sleeve, a bevel gear engaging both bevel gears specified whereby they may be driven in opposite directions, a shaft which is rotatably fitted in the tubular hub of the first mentioned bevel gear and is also fitted with in and has a tongue and groove engagement with the sleeve, a spur pinion fixed to said shaft between the two bevel gears, each of said bevel gears being formed with an internal gear constructed to mesh with the spur pinion on said shaft, and means to move said shaft endwise in either direction from a neutral position to selectively cause said spur pinion to mesh with the internal gears on said bevel gears.

4. In mechanism of the character specified, the combination of two bearing supports, a tubular hub rotatably mounted in one of said bearing supports on annular ball bearings supported therein, said hub having at its inner end a flange, a sleeve rotatably mounted on annular ball bearings in the other bearing support, a gear hub rotatably mounted upon said sleeve and provided with a flange, means to prevent endwise movement of said hub upon said sleeve, two annular bevel gears which are respectively fixed to the flanges of said gear hubs and are respectively formed with internal gears, a shaft which is rotatably fitted in the first named gear hub and which is fitted in and has a tongue and groove connection with the said sleeve, a spur pinion fixed to said shaft and constructed for selective engagement with the internal gears on both of said bevel gears, a bevel gear engaging the two bevel gears mentioned to rotate them in opposite directions, a spur gear constantly in mesh with the spur pinion on the shaft, and means to move said shaft in either direction to cause the spur pinion thereon to selectively engage the internal gears on said bevel gears.

5. In direction changing transmission mechanism, the combination of a shaft which is rotatable and movable endwise, a spur pinion fixed thereto, a driven gear constantly in mesh with said spur pinion, two gears rotatably mounted coaxial with said shaft, means operable by the endwise movement of said shaft to selectively clutch said gears to said shaft, means for moving said shaft endwise in either direction from its neutral position, and yielding latch mechanism engaging said shaft moving mechanism to hold it in various positions as required, said shaft moving mechanism including a rock shaft and a forked lever arm secured thereto having tapered ends, and a spring having two notches arranged so that both arms of said fork lever may engage both notches or either arm may engage one of said notches.

6. In direction changing transmission mechanism, the combination of a shaft which is rotatable and movable endwise and is provided with a circumferential groove, a spur pinion fixed thereto, a driven gear constantly in mesh with said spur pinion, two gears rotatably mounted coaxial with said shaft, means operable by the endwise movement of said shaft to selectively clutch said gears to said shaft, means for moving said shaft endwise in either direction from its neutral position, and yielding latch mechanism engaging said shaft moving mechanism to hold it in various positions as required, said shaft moving mechanism including a rock shaft and a forked lever arm secured thereto having tapered ends, and a spring having two notches arranged so that both arms of said fork lever may engage both notches or either arm may engage one of said notches said shaft moving mechanism also including a yoke pivoted midway between its ends the rollers being mounted in the ends of yoke arms engaging the circumferential groove in the shaft, and the yoke having at one end a transverse bar which is straddled by the two arms on the operating lever.

In testimony whereof, I hereunto affix my signature.

ROLLIN H. WHITE.